United States Patent
Brewster et al.

(10) Patent No.: US 8,448,385 B2
(45) Date of Patent: May 28, 2013

(54) VEHICULAR CONTAINER LID-LATCHING SYSTEM

(75) Inventors: John B Brewster, Homewood, IL (US); Arthur Poulopoulos, Roselle, IL (US); Stuart H Thomson, Downers Grove, IL (US); Mark Y. Zhan, Mokena, IL (US)

(73) Assignee: Holland, L.P., Crete, IL (US)

( * ) Notice: Subject to any disclaimer, the term of this patent is extended or adjusted under 35 U.S.C. 154(b) by 353 days.

(21) Appl. No.: 12/655,055

(22) Filed: Dec. 22, 2009

(65) Prior Publication Data

US 2010/0102574 A1    Apr. 29, 2010

Related U.S. Application Data

(63) Continuation-in-part of application No. 11/893,071, filed on Aug. 14, 2007, now Pat. No. 7,896,593.

(51) Int. Cl.
 *B61D 39/00*    (2006.01)
(52) U.S. Cl.
 USPC .......................................................... 49/503
(58) Field of Classification Search
 USPC .................. 49/382, 465, 394, 395, 503, 414,
  49/428; 292/256.5, 334, 197, 98, 124, 257,
  292/341.17; 105/377.01, 377.11, 406.1;
  296/100.07; 410/69, 70, 80, 84; 298/23 A,
  298/23 B, 23 F; 220/322, 326
 See application file for complete search history.

(56) References Cited

U.S. PATENT DOCUMENTS

| | | |
|---|---|---|
| 1,335,958 A * | 4/1920 | Farr |
| 1,888,653 A | 11/1932 | Bonsall |
| 2,742,866 A | 4/1956 | Nystrom |
| 2,985,118 A | 5/1961 | Maharick et al. |
| 3,365,229 A | 1/1968 | Hitch |
| 3,504,637 A | 4/1970 | Miller |
| 3,572,821 A | 3/1971 | Van Antwerp |
| 3,587,476 A | 6/1971 | Ingram |
| 3,603,267 A | 9/1971 | Schwiebert |
| 3,604,363 A | 9/1971 | Smith |
| 3,604,364 A | 9/1971 | Sweger |
| 3,628,222 A | 12/1971 | Palen |
| 3,630,155 A | 12/1971 | Marulic |
| 3,690,272 A | 9/1972 | Ogle et al. |
| 3,774,551 A | 11/1973 | Sweger |
| 4,046,082 A | 9/1977 | Tedesco et al. |
| 4,236,853 A | 12/1980 | Niggemeier |
| 4,275,662 A | 6/1981 | Adler et al. |
| 4,277,212 A | 7/1981 | Rosaia |
| 4,368,674 A | 1/1983 | Wiens et al. |
| 4,372,715 A | 2/1983 | Naffa |
| 4,382,734 A | 5/1983 | Synowiec |
| 4,382,735 A | 5/1983 | Synowiec |
| 4,430,032 A | 2/1984 | Morgan |
| 4,522,440 A | 6/1985 | Gostomski |

(Continued)

*Primary Examiner* — Stephen Gordon
(74) *Attorney, Agent, or Firm* — Meroni + Meroni, P.C.; Charles F. Meroni, Jr.; Christopher J. Scott

(57) ABSTRACT

A vehicular container, lid-latching system and method is practiced by outfitting a vehicular container and container lid with an automatic uniquely configured latch mechanism and a latch-engaging structure uniquely configured to cooperably engage the latch mechanism. The latch mechanism is automatically operable by way of engagement with structure directed thereagainst and preferably outfitted upon the container at one end thereof. The latch-engaging structure, preferably outfitted upon the lid, engages the latching mechanism under a directed load and for automatic and selective latching securement or latching release of the lid relative to the container.

19 Claims, 12 Drawing Sheets

U.S. PATENT DOCUMENTS

| | | |
|---|---|---|
| 4,523,784 A | 6/1985 | Aspen |
| 4,626,155 A | 12/1986 | Hlinsky |
| 5,054,402 A | 10/1991 | Brassell |
| 5,078,560 A | 1/1992 | Patrick et al. |
| 5,090,638 A | 2/1992 | Eilenstein-Wiegmanns |
| 5,102,001 A | 4/1992 | Teague et al. |
| 5,106,247 A | 4/1992 | Hove |
| 5,230,434 A | 7/1993 | Patrick et al. |
| 5,238,357 A | 8/1993 | Patrick |
| 5,474,341 A | 12/1995 | Putman |
| 5,560,088 A | 10/1996 | Nitsche |
| 5,570,981 A | 11/1996 | Brewster |
| 5,797,169 A | 8/1998 | Donner |
| 6,039,362 A * | 3/2000 | Nadherny |
| 6,250,233 B1 | 6/2001 | Luckring |
| 7,114,898 B2 | 10/2006 | Brewster |
| 7,210,413 B2 | 5/2007 | Barry et al. |
| 7,549,552 B2 | 6/2009 | Hasegawa et al. |
| 2001/0045073 A1 | 11/2001 | Bresnahan |
| 2003/0141740 A1 | 7/2003 | Comstock |
| 2007/0024063 A1 | 2/2007 | Silverio et al. |
| 2007/0034110 A1 | 2/2007 | Zupanich et al. |
| 2007/0214997 A1 | 9/2007 | Zupanich |
| 2007/0234926 A1 | 10/2007 | Brewster |
| 2009/0047090 A1 | 2/2009 | Brewster |
| 2009/0188288 A1 | 7/2009 | Soma |

* cited by examiner

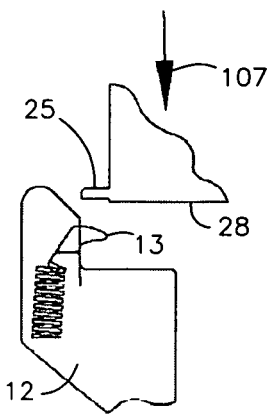
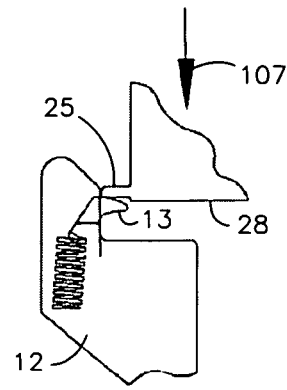
FIG. 7              FIG. 8
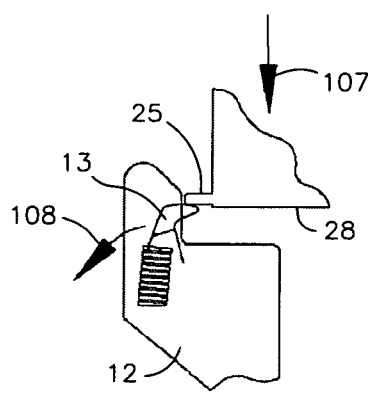
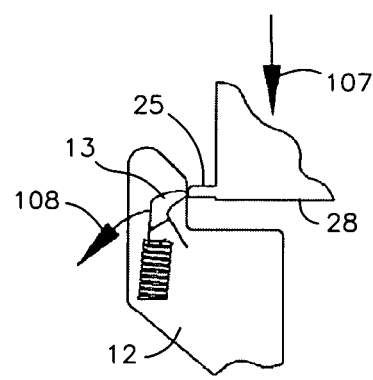
FIG. 9              FIG. 10
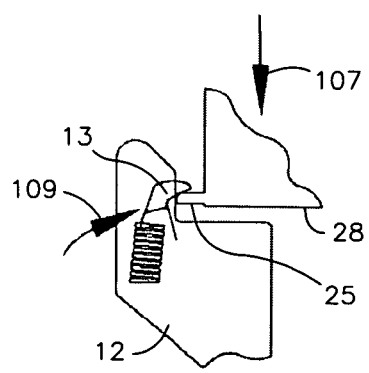
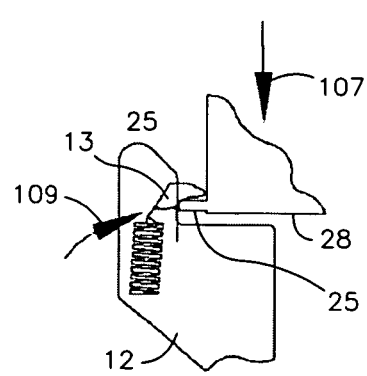
FIG. 11             FIG. 12

VEHICULAR CONTAINER LID-LATCHING SYSTEM

PRIOR HISTORY

This application claims the benefit of U.S. patent application Ser. No. 11/893,071, filed in the United States Patent and Trademark Office on Aug. 14, 2007, and issued into U.S. Pat. No. 7,896,593 on Mar. 1, 2011.

BACKGROUND OF THE INVENTION

1. Field of the Invention

The present invention generally relates to a lid latching arrangement for use in securing a lid structure to an open-topped, vehicular container. More particularly, the present invention relates to a lid latching system, assembly, method for automatically and non-manually latching a container lid to an open, topped, cargo type vehicular container.

2. Description of Related Art

As noted in U.S. Patent Application Publication No. 2007/0234926 ('926 Publication), also authored by Brewster, covers or lid structures for gondola type rail cars first appeared in the 1950's in an attempt to prevent environmental debris from coming into contact with the cargo contained in the cars. In the 1970's, gondola covers were added to prevent precipitation and/or moisture from contacting cargo (such as coal) and further to prevent portions of the cargo (such as coal dust) from escaping the container during transport.

In the 1980's, covers were installed on gondola cars as a means to prevent moisture penetration and wind erosion of fine ore. Many of these prior art covers or lid structures were held in place by manually actuated devices to prevent wind erosion. Additionally, moisture could not be tolerated. In response to the foregoing problems, covers were added. These early covers assemblies incorporated the use of manually operated hold down or latch type devices.

Gondola covers, especially those constructed from lightweight materials such as fiberglass often lack sufficient weight; a train moving through a cross wind will experience certain "kiting" or "wing" effects, which effects often lift such lightweight covers or lids off the car. In response to this problem, certain so-called "positive" hold-down devices were then developed. Manually actuated hold-down devices function well to hold down gondola covers, but are labor intensive and have been found to be damage prone.

In the 1990's certain so-called automatic hold down devices were introduced by Eco-Fab of Vancouver, British Columbia. These devices were not truly automatic devices, however. The devices operated to "lock" the cover when it was dropped on to the railcar/gondola. The removal of this type of cover required a "spreader" device cooperatively associated with an overhead crane, which spreader device would drop down and engage the locks so that when the cover was lifted, the locks would release in a manner similar to manual lock release. A more accurate term for these types of devices is perhaps a "semi-automatic" lock.

With specific reference to patented prior art, U.S. Pat. No. 1,888,653 ('653 patent), issued to Bonsall, discloses a Removable Gondola Car Roof. The '653 patent describes an invention which relates to removable roofs for gondola cars. It has for its principal objects to provide a sectional sheet metal roof that can be readily assembled on and dismounted from cars of the above type that can be applied to cars of substantially different widths and to cars with bowed side rails that will permit the sheets to be compactly stacked for shipment.

The invention essentially consists in the removable gondola car roof, and in the parts and arrangements and combinations and parts described and claimed. The outer side marginal portions of the eaves plates of the roof are offset upwardly to form supports for the eaves and portions of the roof sheets; and said roof sheets are rigidly secured to the sheet supporting portions of said plates by means of carnage bolts that extend through the widened eaves and portions of the base flanges of the overlapping ribs of the sheets and the body portion of the sheets located therebelow. It will thus be seen that the roof or lid sections are bolted to the gondola car—a manually dependent securing arrangement.

U.S. Pat. No. 2,985,118 ('118 patent), which issued to Maharick et al., discloses a Gondola Car Roof. The '118 patent describes certain panels which are locked on angle irons by clamps each of which comprise a pair of spaced vertical plates welded to a web and flange in the center thereof. The plates are cross drilled with aligned openings therein, the inner openings being provided for a draw pin retained, when assembled, by a chain affixed to the flange and a cotter pin.

A pin in the outer opening constitutes a fulcrum for a steel strap having the upper forward end thereon bent downwardly over the fixed pin in the plates, and the rearward end thereof being looped downwardly and outwardly to underlie the pin. The free outer end of the strap is bent downwardly and inwardly to form a hook adjacent a boss on the angle of the supporting rail. When it is desirable to remove the panels, the draw pin is removed and the strap is moved outwardly then swung upwardly about the pin, until the strap lies parallel and adjacent to the flange. It will be seen that the latch device requires manual intervention to secure the roof to the gondola car.

U.S. Pat. No. 3,504,637 ('637 patent), which issued to Miller, discloses an Open Top Railroad Car having a Removable Roof Structure. The '637 patent describes a removable roof structure on a gondola railroad car having an open top wherein the roof structure comprises a plurality of separable roof sections releasably held together by a splice carline roof overlapping arrangement. Each roof section is provided with stacking structure for mounting one roof section upon the other for storage. A splice structure receives a stop mounted on the car and the corner of the roof end section is provided with a corresponding cooperating corner stop or stake to limit movement of the roof sections when placed atop the open car structure.

Certain manually or mechanically actuable roof locking means are provided that are on the open top car portion for locking of the roof sections as a unit on the open top car body. In this last regard, it will be seen from an inspection of FIGS. 10 and 11 that in order for the latch arm to be removed outwardly about its pivot portion, a counterweight must first be rotated clockwise to remove an ear out of obstructing position with respect to a lug on the roof side plate. Clearly, the roof locking means of the '637 patent are not automatic, and require manual intervention to effect locking securement and release.

U.S. Pat. No. 4,046,082 ('082 patent), which issued to Tedesco et al, discloses a Trough Hatch Locking Device. The '082 patent describes a locking device for railway hopper cars having continuous trough hatch openings and a plurality of associated hinged covers arranged end-to-end. Hold-down arms, also pivotally mounted, are positioned to overlap and seal adjacent hatch cover ends. Each hold-down arm has a spring loaded, locking latch with a keeper hook for automatically engaging an associated keeper lug mounted to the hopper car adjacent the hatch opening. The locking hatch has an upper flange that may be foot engaged to unlock the holddown arm by pivoting the locking latch to disengage the keeper hook from the keeper lug. The '082 patent thus shows a locking or latching mechanism most easily operated by way of a user's foot. Human intervention at the latch site is thus required.

U.S. Pat. No. 4,368,674 ('674 patent), which issued to Wiens et al, discloses a Hatch Cover for Railroad Hopper Cars. The '674 patent describes a hatch cover comprising a main panel and a stepped periphery, both of which are constructed of polyester resin impregnated with glass fiber reinforcement. Stiffening ribs on the panel include a honeycomb core enclosed by a rigid shell formed by glass fiber reinforced resin. The entire periphery of the panel is strengthened by thickening it, and the areas to which the hinges are attached are thickened. The hatch cover is constructed by applying an exterior protective coating to a mold surface, spraying resin and chopped glass fibers into the mold, inserting the honeycomb core portions of the ribs into the mold in a crossing pattern, and spraying additional resin and glass fibers onto the honeycomb to form the shell which encloses the core of each rib.

Although not specifically illustrated, a suitable latch serves to hold down the hatch covers down in the closed position covering and sealing the open top of the hopper car. Opening of each hatch cover is accomplished by unlatching it and swinging it upwardly to the open position. Typically, opening of the hatch cover is carried out in a rough manner with the hatch cover being forcefully slammed downwardly toward the walkway. Additionally, it is not uncommon for workers to walk on the open hatch cover, thereby applying severe forces to the hinges, particularly if the hinges hold it up off of the walkway. Consequently, the sturdy construction of the hinge plates and the thickened areas of the hatch cover adjacent to the hinges are important in preventing cracks and other damage to these potential problem areas. The thickening of the entire peripheral portion of the hatch cover is also important in that the periphery is more susceptible to damage than the remainder of the cover. The '674 patent thus describes problems with manual latching systems, and addresses the problems via a unique, sturdy lid construction.

U.S. Pat. No. 4,523,784 ('784 patent), which issued to Aspen, discloses a Latch Construction for Locking a Cover to a Platform of a Lorry. The '784 patent describes a latch construction comprising a profile rail bolted to the side members and back member of the platform; several manually operable latch units along the rail include latch elements for releasably receiving the straps depending from the cover; and a wire inside the rail for simultaneously operating all latch elements along the wire from a central latch device including a key-operated lock. In order to connect the wires from rails of adjacent side members, there are adapted manually operable interconnection devices. The straps are manually operable telescopic straps spring-biased towards the retracted position and are adapted to be releasably retained by a depending shoulder of the rail. The '784 patent discloses a latch construction highly dependent upon manual intervention.

U.S. Pat. No. 5,054,402 ('402 patent) discloses a Removable Cover for Gondola Cars with Lightweight Composite Panel Construction is illustrative of certain state of the art gondola lid systems. The '402 patent describes a lid for gondola cars or the like comprising a rectangular frame approximating in geometry and size the open top of a gondola car and supporting therein a plurality of lightweight panels. The lightweight panels are made of polymer foam sandwiched between sheets of light gauge steel.

The lid is retained on the gondola car by a plurality of spaced manually-operated, ratchet binders and includes a pair of spaced tripod straps attached thereto, wherein the lid may be conveniently lifted from and replaced on existing gondola cars. The ratchet binders each have a strap or cable outfitted with a hook for engaging the lower surface of a rail, flange or the like on a gondola car. The ratchet binders are manually tightened by way handles. Notably, the '402 patent shows roughly a dozen ratchet binders in the illustrated embodiments. The '402 patent thus teaches or describes a lid latching arrangement also highly dependent upon manual intervention.

U.S. Pat. No. 5,102,001 ('001 patent), which issued to Teague et al., discloses a Lid-to-Container Locking Assembly. The '001 patent describes a lid-to-container locking assembly for lock sealing containers utilized in the transporting, storage and disposal of low level radioactive contaminated material. The locking assembly gives visual indications of a locked, sealed condition of the container through the utilization of manually operable closure or locking elements that are ensconced in a latched position upon the lid to be secured, as well as to the container to be sealed. Detachment of the closure element at either of these points of its locking engagement with the lid and/or container will visually indicate an open and unsealed condition. Notably, the locking members 15 and 25 of the '001 patent are manually actuable.

U.S. Pat. No. 5,474,341 ('341 patent), which issued to Putman et al., discloses a Gravity Actuated Container Lock for use on sedentary refuse containers. The '341 patent describes a locking mechanism for a container having a hinged lid comprising a shaft adapted to be secured to a container and journaled for rotation about its axis. A locking bar is removably secured to the shaft and rotatable about the axis with the shaft between a locked position and an unlocked position.

Notably, however, certain locking means, as exemplified by a padlock, are outfitted upon the shaft to prevent rotation thereof. Under normal operation the padlock must first be manually removed. Further, the container lock of the '341 patent is operable by way of lifting the container as outfitted with the lids and container lock only after the padlock has been removed. The '341 patent thus not only requires manual intervention to remove the padlock, but requires the user to lift and rotate both the container, lock, and lid combination.

Further, United States Patent Application Publication No. US 2007/0214997, which was authored by Zupancich, describes an open-top rail car cover defined by a frame having dimensions sufficient to fit an open-top freight car. A latch disposed about a side of the frame includes a first flange and a second flange that combine to define a means for receiving an engagement member of a rail car. Both the first and second flanges include at least one first aperture and at least one second aperture designed to receive a means for securing the car cover to the rail car. The first and second apertures have dimensions sufficient to permit movement of the first and second flanges about the means for receiving, which means are defined or exemplified by pin-like structure(s), and which pin-like structures must be manually inserted through said apertures to effect locking securement and release.

United States Patent Application Publication No. 2007/0234926, which was authored by Brewster, describes a semi-automatic lid latch which operates to secure the periphery of a lid to a container. The device comprises latch housing, a manually operable trigger assembly, an arm assembly, and a linkage assembly. The housing defines opposing trigger access windows for enabling manual operation of the trigger.

The trigger assembly comprises a trigger having first and second member ends and is manually pivotable about the first pivot axis.

The arm assembly comprises first and second anchor ends and is pivotable about the second pivot axis. The linkage assembly links the second member end to the first anchor end for transferring manual trigger action to the arm assembly. The access windows enable bidirectional access to the trigger, which trigger is thus actuable from opposing directions at the first member end. The actuated trigger unidirectionally pivots the second anchor end for displacing the second anchor end from a locked position to a release position. The arm assembly is automatically actuable when the lid is secured to the container and manually actuable when the lid is released from the container.

In addition to the foregoing lid latching art, certain container securing art may be deemed pertinent to the present invention insofar as various latching means have also been developed in relation thereto. Some of the more pertinent art relating to container securement means and methodology and the like may be referenced in U.S. Pat. Nos. 3,604,363; 3,604,364; 3,628,222; 3,630,155; 3,774,551; 4,236,853; 4,277,212; 4,372,715; 4,382,734; 4,382,735; 4,430,032; 4,626,155; 5,090,638; 5,106,247; 5,560,088; 5,570,981; 5,797,169; and 7,114,898.

Notably, United States Patent Application Publication No. US 2009/0047090 ('090 Publication), which was authored by Brewster, describes an improved cargo container securement device comprising a housing defined by a base which forms a planar surfacing thereabout on which cargo container corner fittings rest in applied relation on the container relative to the supporting structure or platform involved.

The Brewster device includes a flanged end which engages a cargo container corner casting aperture opening or an appropriate aperture and utilizes the structure for retention of the securement device so the opposite side of the hold down device is allowed to automatically engage and disengage with a cargo container corner fitting as necessary to achieve proper handling and transport of cargo containers. The device of the '090 Publication comprises an indicator to visually signal that the automatic hold down feature of the device is engaged or disengaged with a cargo container corner fitting of cargo containers.

Certain aspects of the device exemplified in the '090 Publication as well as the device of the '926 Publication, are built upon in this application to support a vehicular container, lid-latching system, assembly, and method. To this end, certain basic concepts of the Brewster devices otherwise described in the '090 and '926 Publications are improved upon or otherwise applied to support the system and methodology of this application.

It will be seen that the forgoing prior art teaches certain parameters for container and lid locks and use various complex solutions to meet the needs taught. Additionally, it may be seen that the prior art typically uses either complex spring mounting and seating arrangements or spring mounting and/or seating arrangements that are difficult to work with, and require some sort of manual intervention to secure and/or release the lid locks or lid latching hardware.

SUMMARY OF THE INVENTION

The instant invention departs from the prior art in that it eliminates the complexity of the mechanisms otherwise presented by the prior art, and provides a simplistic latching system, assembly, and method for latching vehicular container lids to vehicular containers. In this regard, it is noted that the prior art perceives a need for a system and/or method for latching lids whereby the lid-latching securement and lid-latching release processes are automatically achieved via directional motion of properly outfitted interfaces of vehicular containers and the lids therefor.

In this regard, the present invention provides a vehicular container lid-latching system and/or method whereby a vehicular container lid may be automatically and non-manually secured and released to and from a vehicular container by way of directional motion of a properly outfitted lid relative to a properly outfitted vehicular container. It is contemplated that while the vehicular container will normally remain motionless relative to the container lid, the container lid may be directed or moved via certain state of the art lid-lifting means.

The vehicular container, lid-latching system according to the present invention preferably and essentially comprises a vehicular container lid, a vehicular container, certain load-actuable, latching means, and certain load-imparting, latch-engaging means. The load-actuable, latching means are believed best exemplified by at least one, but preferably two opposed latch mechanisms outfitted upon opposed sides of either the vehicular container or the container lid.

The load-imparting, latch-engaging means according to the present invention are believed best exemplified by at least one, but preferably two opposed latch engaging structures outfitted upon opposed sides of either the container lid or vehicular container depending on placement of the latch mechanism(s). The latch mechanism comprises a spring-biased latch member which is load actuable via engagement with the latch-engaging structure. Under a load as directed in one of two opposed directions, the latch member is displaced in one of two general directions to open and close a lid-letting pathway to achieve securement and automatic entry and release of the lid.

It is contemplated that the latch engaging structure may be defined by an extended protrusion from structure alignable opposite the latch mechanism. The length of the extended protrusion of latch-engaging structure is preferably substantially the same length of the latch member as fully spring-biased and extended from the housing of the latch mechanism. When fully retracted into the housing, the latch member opens a structural-letting or lid-letting pathway. When fully extended from the housing, the latch member closes the structural-letting or lid-letting pathway.

Once the tips of the latch member and latch-engaging protrusion pass each other as the latch-engaging protrusion moves in the first direction relative to the latch mechanism, the lid-letting pathway closes as the spring-biased latch member is restored to its original state or zero net displacement, thereby latch securing the latch-engaging protrusion to the latch mechanism. To release the latch-engaging protrusion from the latch mechanism, the protrusion is simply directed in an opposite direction.

From a consideration of the foregoing, it follows that the automatic, lid-latching method according to the present invention is contemplated to comprise the essential steps of initially providing a container-topping lid and an open-topped, vehicular container. The container-topping lid comprises laterally opposed lid sections, each lid section comprising a laterally-extending, latch-engaging protrusion. The container comprises laterally opposed, vertically extending walls, each wall having an upper wall section.

The most typical methodology comprises the further steps of outfitting each upper wall section with a latch mechanism, wherein each latch mechanism is operable via downward and upward motion of the latch-engaging protrusions. Notably, each latch mechanism comprises a latch member. As illustrated in the exemplary drawings accompanying this specification, the latch-engaging protrusions are simultaneously directed downwardly toward the latch mechanisms and the latch members are simultaneously directed outward via the downwardly directed latch-engaging protrusions for opening a lid-letting pathway.

While the typical methodology involves opposed latch-engaging protrusions and opposed latch mechanisms, it is contemplated that a single latch-engaging structure or protrusion may be made cooperable with a single latch mechanism. Further, although the method contemplates a single paired set of opposed latch-engaging protrusions and opposed latch mechanisms, it is further contemplated that multiple paired sets of opposed latch-engaging protrusions and opposed latch mechanisms may be outfitted upon a vehicular container and container lid.

The lid is then directed the lid into the member- or lid-letting pathway, whereafter the latch members are simultaneously directed laterally inward for closing the lid-letting pathway, and latch-securing the lid to the container. To latch-release the lid from the container, the method comprises the steps of simultaneously directing the latch-engaging protrusions upwardly toward the latch mechanisms; simultaneously directing the latch members laterally outward via the upwardly directed latch-engaging protrusions for reopening the lid-letting pathway; directing the lid into the lid-letting pathway; and simultaneously directing the latch members laterally inward for closing the lid-letting pathway, thereby latch-releasing the lid from the container.

BRIEF DESCRIPTION OF THE DRAWINGS

Other features of our invention will become more evident from a consideration of the following brief description of patent drawings:

FIG. 7 is a first sequential view of the structures otherwise depicted in FIG. 6 showing the latch-engaging structure being directed in a first direction just prior to engagement with the generic latching mechanism.

FIG. 8 is a second sequential view of the structures otherwise depicted in FIG. 7 showing the latch-engaging structure being directed in the first direction into engagement with convex surfacing of a latch member of the latching mechanism.

FIG. 9 is a third sequential view of the structures otherwise depicted in FIG. 8 showing the latch-engaging structure displacing the latch member via the convex surfacing in a second direction for opening a lid-letting pathway.

FIG. 10 is a fourth sequential view of the structures otherwise depicted in FIG. 9 showing the latch-engaging structure entering the lid-letting pathway otherwise opened by the displaced latch member.

FIG. 11 is a fifth sequential view of the structures otherwise depicted in FIG. 10 showing the latch-engaging structure just after passing through the lid-letting pathway and the latch member being displaced in a third direction opposite the second direction for closing the lid-letting pathway.

FIG. 12 is a sixth sequential view of the structures otherwise depicted in FIG. 11 showing the latch-engaging structure having passed through the lid-letting pathway and the latch member being further displaced in the third direction thereby closing the lid-letting pathway.

FIG. 18 is identical to FIG. 7 but for the vector direction of the lid-engaging structure.

DETAILED DESCRIPTION OF THE PREFERRED EMBODIMENT

Figure 1:
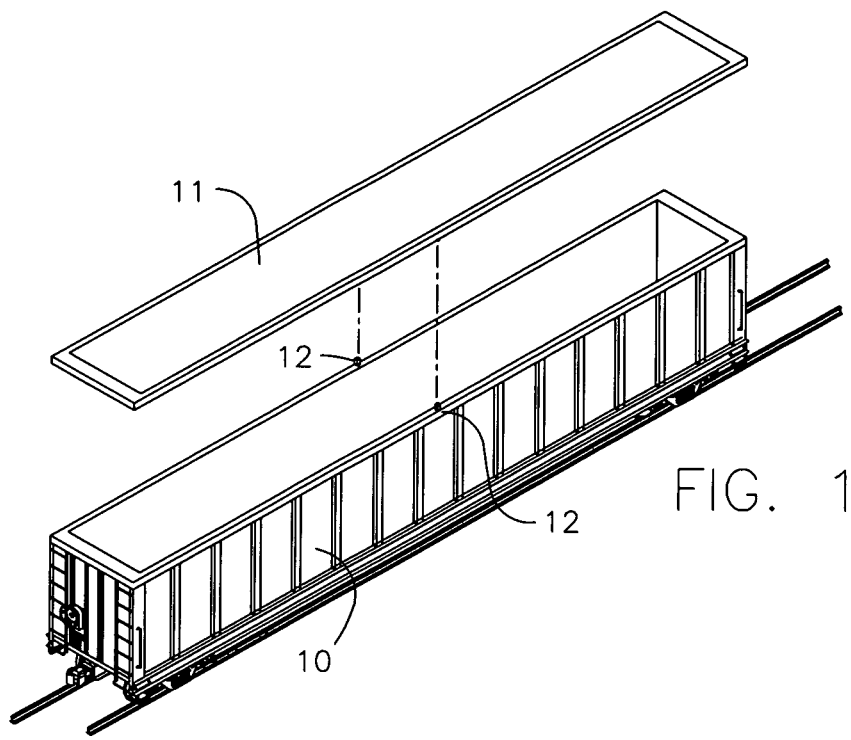
FIG. 1 is a top perspective type depiction of a first open top, gondola type railroad car container with a planar type lid exploded therefrom showing laterally opposed latching means situated intermediate the length of the railroad car for latching the lid to the car.

Referring now to the drawings with more specificity, it may be seen from a consideration of the various figures that the present invention essentially presents a system and method for automatically or non-manually latching vehicular container lids as severally depicted and referenced at 11 to and from vehicular containers as severally depicted and referenced at 10. As was noted in the '926 Publication, vehicular container covers 11 prevent precipitation and/or moisture from contacting cargo (such as coal as at 120) and prevent portions of the cargo 120 (such as coal dust) from escaping the container 10 during transport.

Figure 5:
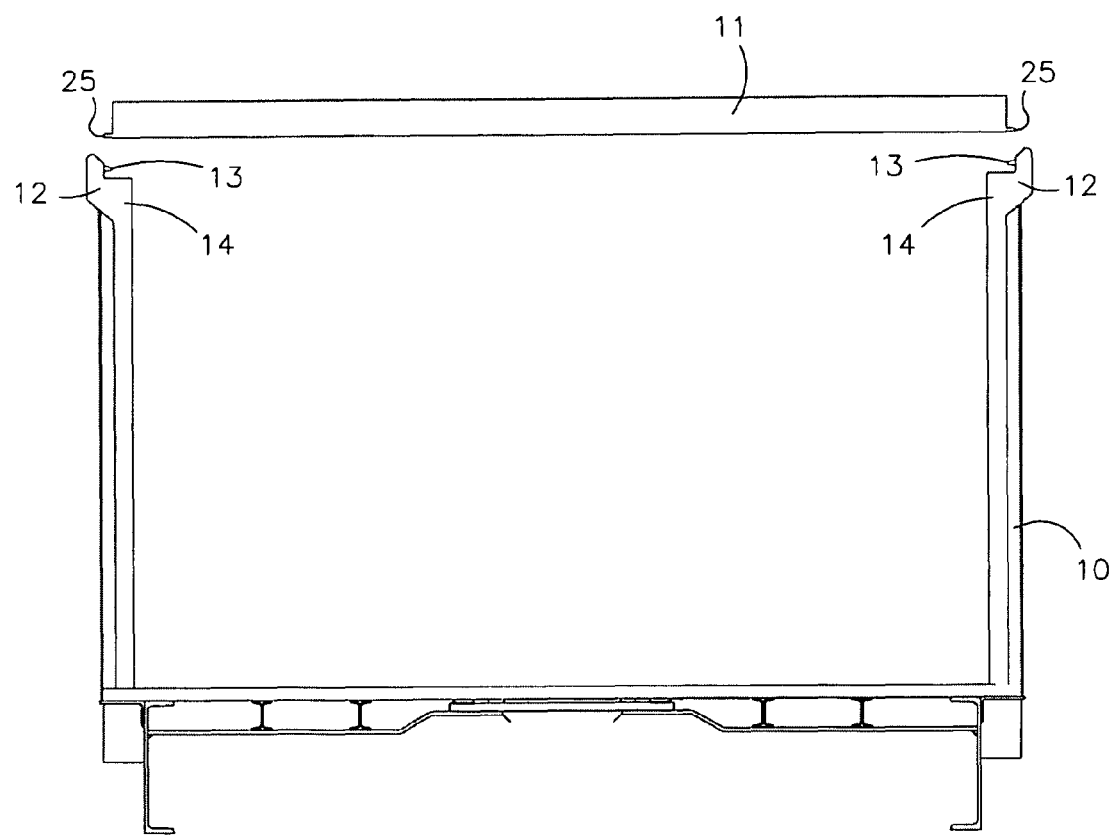
FIG. 5 is a transverse cross sectional type depiction of a generic, open top type vehicular container with a planar type lid exploded therefrom showing laterally opposed latching means for latching the lid to the container.

In addition to preventing environmental impact on the cargo by preventing moisture or precipitation to contaminate the cargo 120, it is noted that vehicular containers 10 such as rail transport vehicular containers 10 (such as gondola type containers as generally depicted in FIGS. 1-4) and road transport vehicular containers 10 (such as refuse type containers as generally depicted in FIG. 5) are subject to ever more stringent transport requirements, including requirements for covering or enclosing transported materials so that the materials tend to remain contained during transport thereby reducing the impact of the (escapee) cargo on the environment.

As earlier noted, the prior art shows certain systems and methods for covering or otherwise providing vehicular containers with lids. In this regard, however, the prior art appears to be silent on automatic, non-manual or non-mechanical means for securing and releasing covers or lids from vehicular containers. In other words, prior art methodology involves highly manual or highly mechanical means for latching or securing/releasing covers and/or lids to and from vehicular containers.

In this regard, it is noted that U.S. Patent Application Publication No. 2007/0214997, which was authored by Zupancich, discloses certain means for covering open top rail cars. Zupancich attempts to remedy or otherwise address certain shortcomings in the prior art in terms of damage to covers from the stress/strain type fractures attendant to prior art latch mechanisms of the type otherwise illustrated in FIGS. 1-3 of the Zupancich publication.

Zupancich's attempts to provide a solution to the problems noted with prior art lid latching means, however, fall short of providing fully automatic lid latching means. The latch of the Zupancich disclosure comprises first and second flanges that combine to define certain means for receiving an engagement member of a rail car. Both the first and second flanges include at least two apertures adapted or designed to receive certain fastening means for securing the car cover to the rail car, which means visually appear to be pins of some generic sort.

The means for securing may be any object that can be punched, welded, screwed, inserted, bolted, injected, or hammered in any combination that are known to one of ordinary skill in the art (See Column 4, Line Nos. 34-38 of the '997 Publication). Notably, the first and second apertures have dimensions sufficient to permit movement of the first and second flanges about the means for receiving.

It is further noted, however, that the Zupancich means for securing are defined by object(s) that must be separately acted upon according to one of ordinary skill in the art in order to secure the Zupancich cover to the vehicular container. In other words, the structural objects of Zupancich's means for securing operate in tandem with the apertures of the Zupancich latch mechanism as well as apertures formed in a flanged structure of the vehicular container rim.

A fair description of the Zupancich lid latching system thus involves pin-like structure insertable through or otherwise made cooperable with pin-receiving apertures formed in at least three flanged structures, two of which are formed on the cover structure in parallel relation so as to receive the third flange (formed on the vehicular container) intermediate the cover flanges. The three flanges are then "pinned" to one another for securing the cover to the container.

The '926 Publication authored by Brewster, describes a lid latch which operates to secure the periphery of a lid to a container. The device comprises latch housing, a trigger assembly, an arm assembly, and a linkage assembly. The housing defines opposing trigger access windows and comprises first and second pivot axes. The trigger assembly comprises a trigger having first and second member ends and is pivotable about the first pivot axis.

The arm assembly comprises first and second anchor ends and is pivotable about the second pivot axis. The linkage assembly links the second member end to the first anchor end for transferring trigger action to the arm assembly. The access windows enable bidirectional access to the trigger, which trigger is thus actuable from opposing directions at the first member end. The actuated trigger unidirectionally pivots the second anchor end for displacing the second anchor end from a locked position to a release position.

Despite the best efforts put forth and incorporated into the prior art developments, the prior art perceives a continuing need for a system and/or method for latching lids whereby the lid-latching securement and lid-latching release processes are automatically achieved via directional motion of properly outfitted interfaces of vehicular containers and the lids therefor. The present invention provides a vehicular container lid-latching system and/or method whereby a vehicular container lid may be automatically and non-manually secured and released to and from a vehicular container by way of directional motion of a properly outfitted lid relative to a properly outfitted vehicular container.

Figure 27:
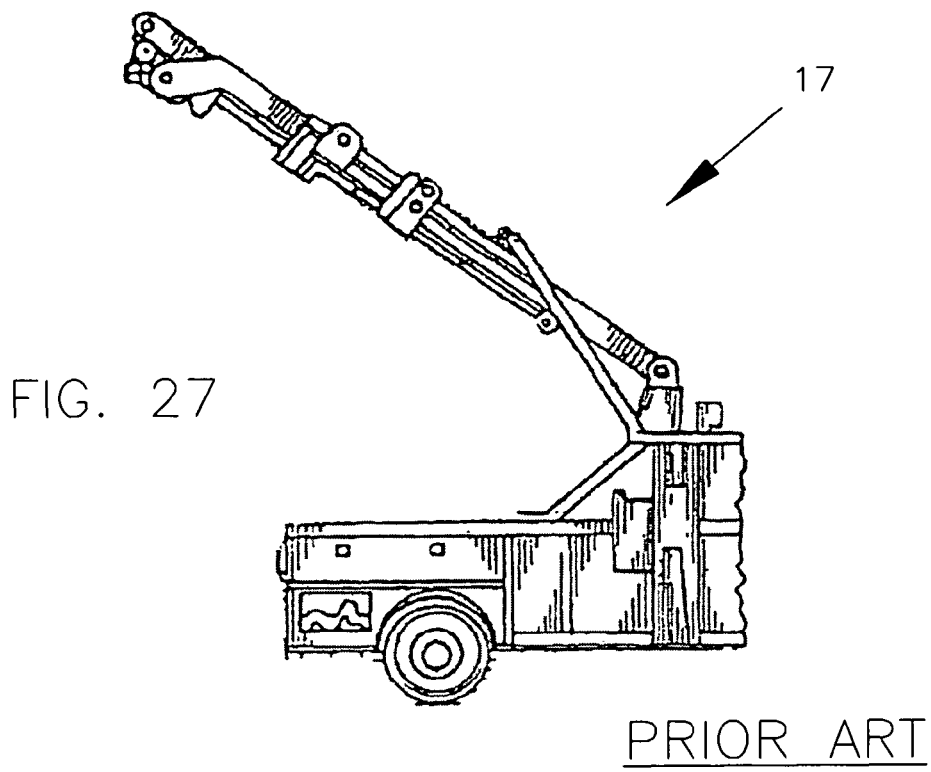
FIG. 27 is a fragmentary side view depiction of a prior art crane for imparting directional movement to the vehicular container lid according to the present invention.
Figure 28:
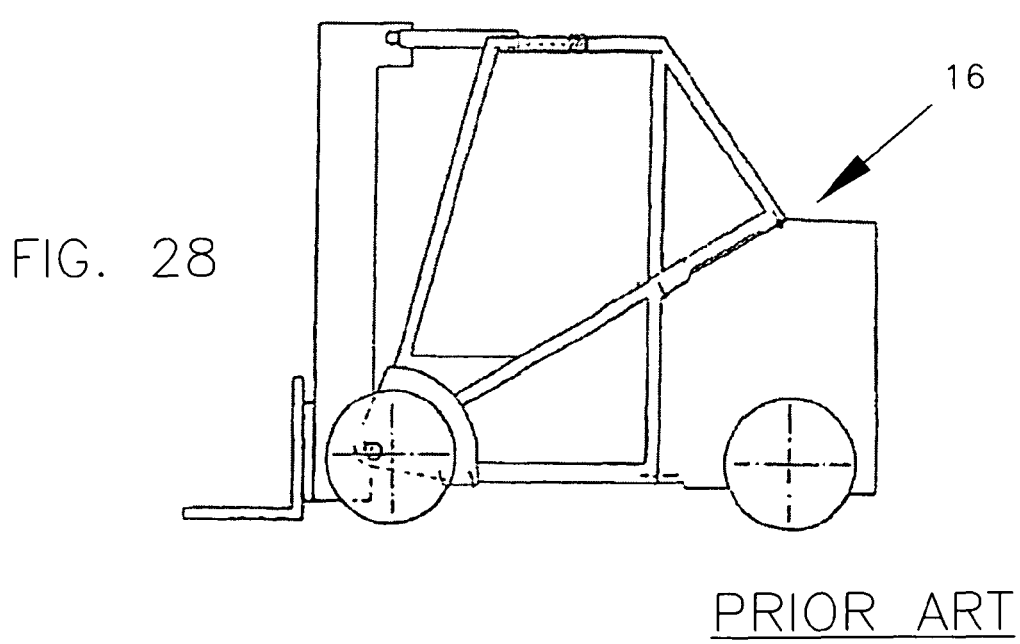
FIG. 28 is a fragmentary side view depiction of a prior art fork lift truck for imparting directional movement to the vehicular container lid according to the present invention.

It is contemplated that while the vehicular container 10 will normally remain motionless relative to the container lid 11, the container lid 11 may be directed or moved via certain force-imparting means, as may be exemplified by a fork lift truck 16 as generally depicted in FIG. 28 or a crane 17 as generally depicted in FIG. 27.

Figure 2:
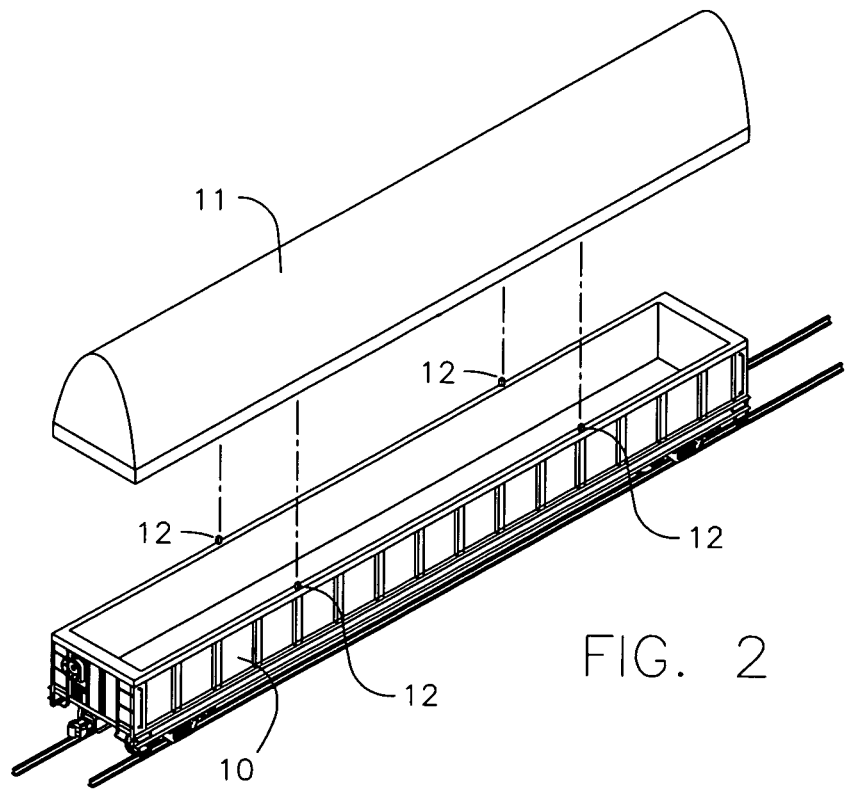
FIG. 2 is a top perspective type depiction of a second open top, gondola type railroad car container with a trough type lid exploded therefrom showing laterally opposed latching means situated intermediate the length of the railroad car for latching the lid to the car.
Figure 3:
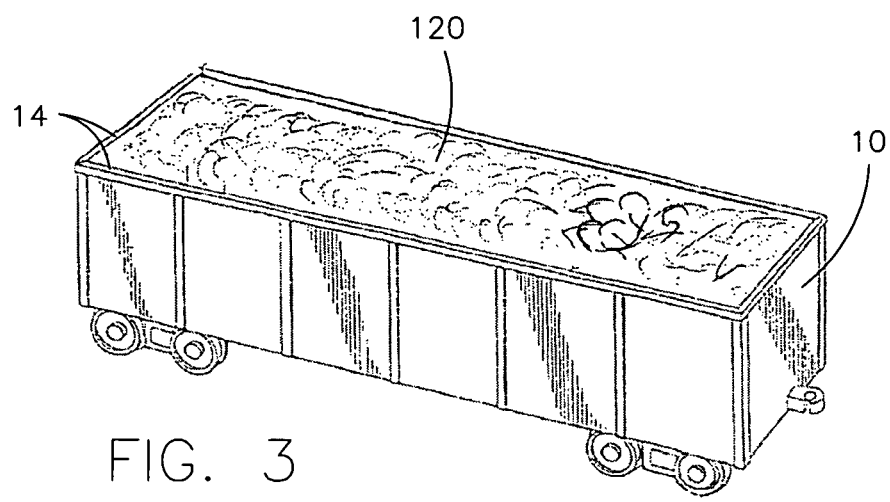
FIG. 3 is a top perspective view of a third open top, gondola type railroad car container containing lid-protectable cargo.
Figure 4:
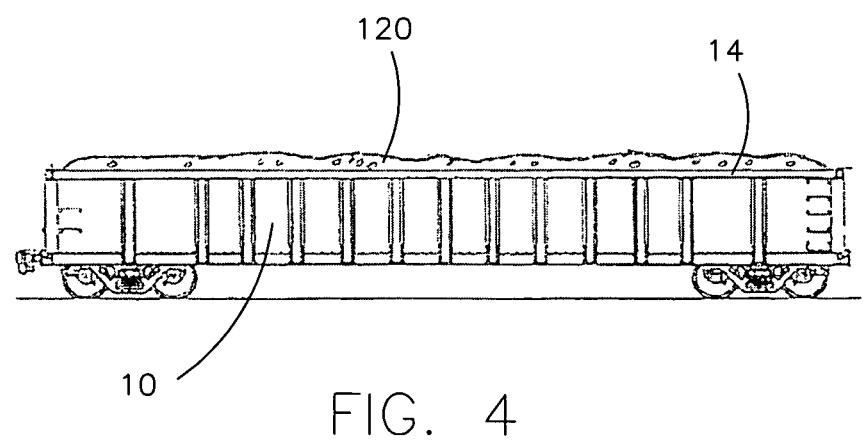
FIG. 4 is a side plan view of a fourth open top, gondola type railroad car container containing lid-protectable cargo.

The vehicular container, lid-latching system according to the present invention preferably comprises, in combination, a vehicular container lid as at 11, a vehicular container as at 10, certain load-actuable, latching means, and certain load-imparting, latch-engaging means. The load-actuable, latching means are believed best exemplified by at least one, but preferably paired set(s) of opposed latch mechanisms 12 as generally depicted throughout the attached illustrations. In this regard, the reader is directed to FIGS. 1 and 2. From a comparative inspection of the noted figures, it may be seen that FIG. 1 depicts a single paired set of opposed latch mechanisms 12, and FIG. 2 depicts two paired sets of opposed latch mechanisms 12.

The latch mechanism 12 is a structurally modified version of the latch device otherwise shown and illustrated (as at device 10) in pending U.S. patent application Ser. No. 11/893,071 ('071 Application), filed in the United States Patent and Trademark Office on Aug. 14, 2007, to which this application claims a benefit, and the specification of which is hereby incorporated by reference thereto. Whereas the latch device shown in the '071 Application is designed to secure containers to vehicle decks, the latching mechanism 12 of the present invention is reconfigured to secure lids 11 to containers 10.

The load-imparting, latch-engaging means according to the present invention are believed to be best exemplified by at least one, but preferably two opposed latch engaging structures as generally and generically depicted at 25. In accordance with the present invention, the spring-biased latch member 13 of the latch mechanism 12 is spring and load actuable via engagement with the latch-engaging structure 25.

Under a load as directed in one of two (first and second) opposed directions (107 versus 110), the latch member 13 is displaced in one of two (third and fourth) general directions (108 versus 109) substantially orthogonal to the first and second load directions to open and close a lid-letting pathway to achieve securement and automatic entry and release of the respective lids 11 as hereinafter disclosed.

The latch mechanism 12 according to the present invention preferably and essentially comprises a multifaceted housing 16, a spring-actuable, latch member 13, and a spring element 17. The housing 16 preferably comprises a path-defining portion 18, a guide portion 19, a lid-supporting interface portion 20, a latch member-receiving portion 21, and a spring-housing or enclosing portion 22. It is contemplated that the housing 16 with portions 18-22 are allowed to be varied so as to engage an appropriate latch-engaging structure 25 of the type generally described and illustrated in this application.

It is contemplated that the latch engaging structure 25 preferably comprises or is defined by an extended protrusion from structure alignable opposite the latch mechanism 12. If the latch mechanism 12 is outfitted upon a vehicular container 10 as diagrammatically depicted in FIGS. 19 and 20, then the latch-engaging structure 25 is outfitted upon the container lid 11. If the latch mechanism 12 is outfitted upon the container lid 11, then the latch-engaging structure 25 is outfitted upon the vehicular container as diagrammatically depicted in FIGS. 21 and 22. FIGS. 19-22 depict fragmentary upper ends 14 of vehicular containers for ease of illustration.

Figure 6:
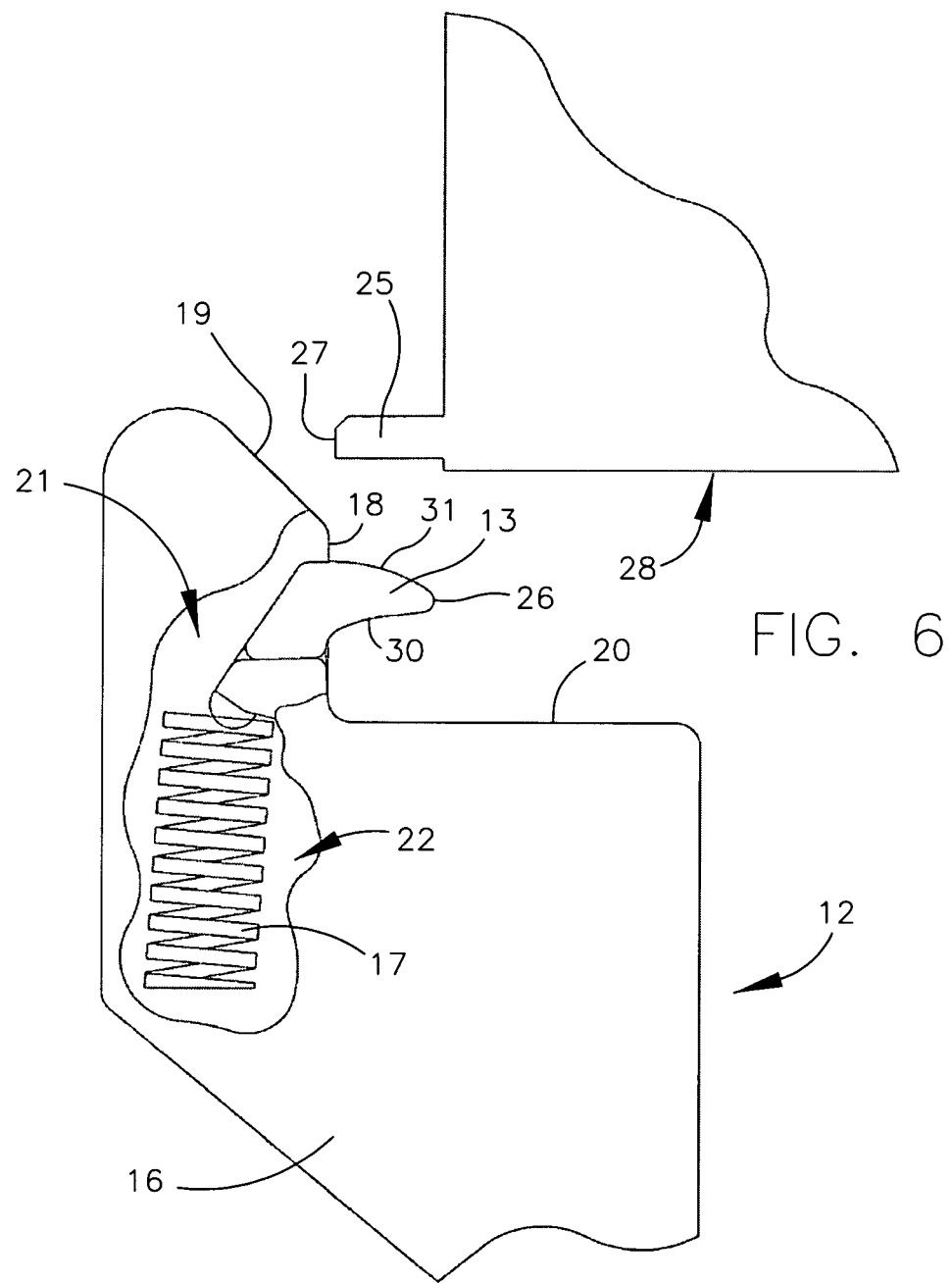
FIG. 6 is a first enlarged, fragmentary side type depiction of a diagrammatic or generic latching mechanism according to the present invention vertically juxtaposed adjacent a latch-engaging structure of a vehicular container lid.
Figure 6A:
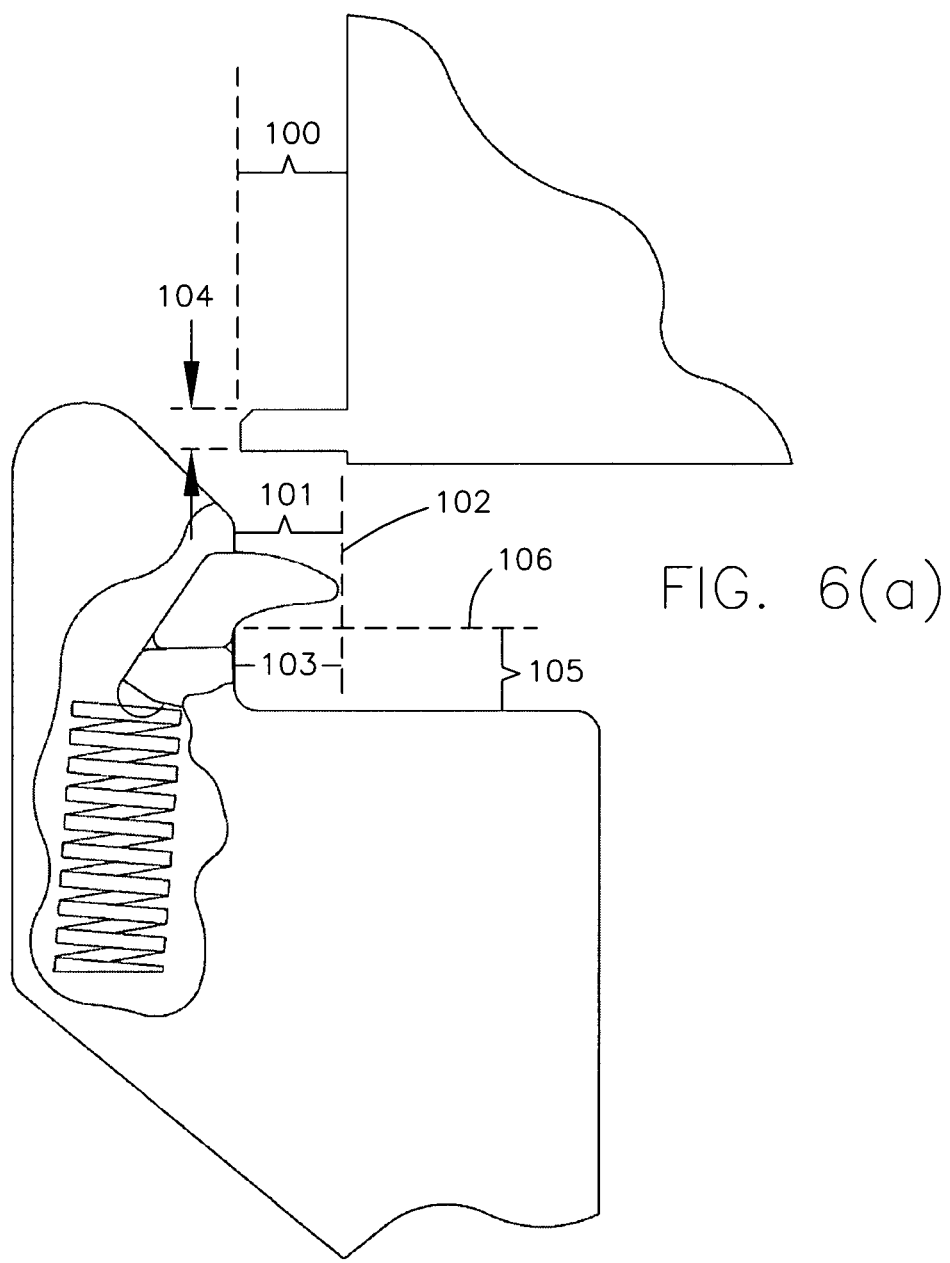
FIG. 6(a) is a second enlarged, fragmentary side type depiction of a diagrammatic or generic latching mechanism according to the present invention vertically juxtaposed adjacent a latch-engaging structure of a vehicular container lid.
Figure 6B:
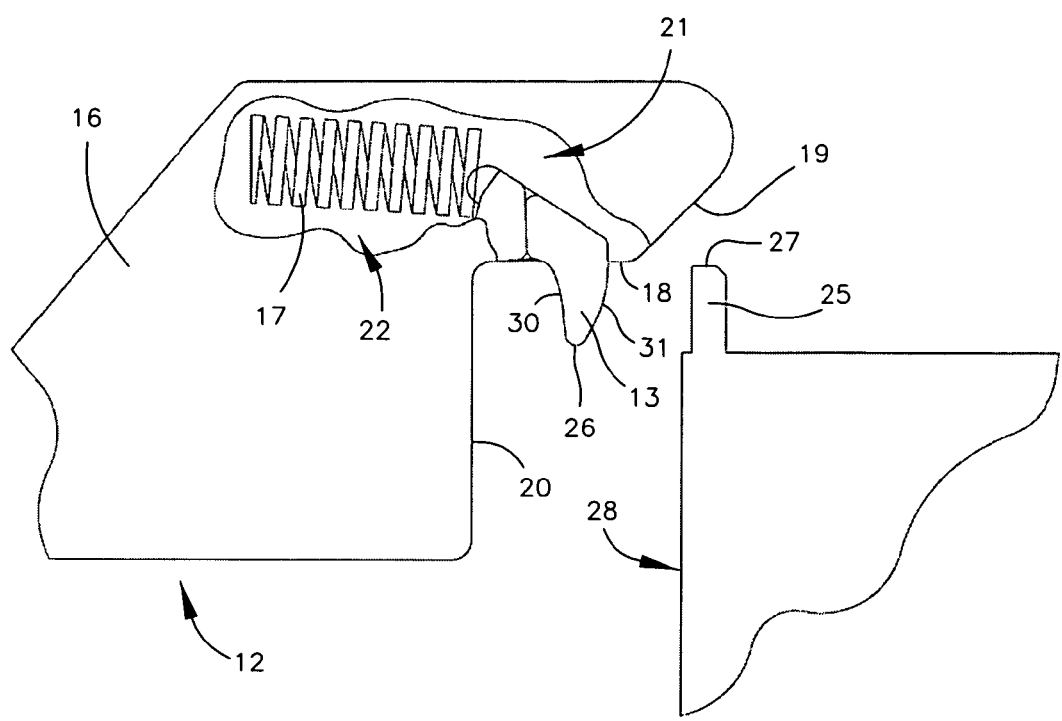
FIG. 6(b) is a third enlarged, fragmentary side type depiction of a diagrammatic or generic latching mechanism according to the present invention horizontally juxtaposed adjacent a latch-engaging structure of a vehicular container lid.
Figure 16:
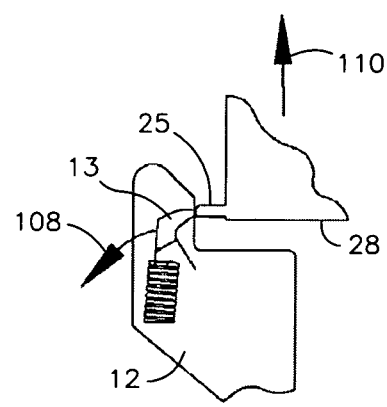
FIG. 16 is a tenth sequential view of the structures otherwise depicted in FIG. 15 showing the latch-engaging structure entering the lid-letting pathway otherwise opened by the displaced latch member.

It will be noted from the various figures, and perhaps most clearly from an inspection of FIG. 6(a) that the length 100 of the extended protrusion of latch-engaging structure 25 is preferably substantially the same length 101 of the latch member 13 as fully spring-biased and extended from the housing 16. When fully retracted into the housing 16 and received by portion 21 (as generally depicted in FIGS. 10 and 16), the latch member 13 opens a structural-letting or lid-letting pathway as may be defined by the open space intermediate portion 18 and plane 102. When fully extended from the housing 16 (as generally depicted in FIGS. 6, 7, 13, and 18), the latch member 13 closes the structural-letting or lid-letting pathway.

The thickness 104 of latch-engaging structure 25 is preferably no greater than the dimension 105 intermediate the portion 20 and the plane 106 parallel thereto, which plane 106 intersects the junction being the fully extended latch member 13 and the portion 18. The lid-letting pathway, when open, thus enables the latch-engaging structure 25 to and from the structure-receiving space 103 as may be defined or bound by planes 102 and 105, and portions 18 and 20.

The spring element 17 is preferably defined by a compression or die spring, and is actuated under a latch securing load applied in a first direction 107 to the latch member 13 from the latch-engaging structure 25. When actuated via the latch member 13, the spring element 17 allows the latch member 13 to generally retract in a second direction 108 into portion 21 as sequentially depicted in FIGS. 7-10. FIG. 10 depicts an opened lid-letting pathway in which the tip 26 of latch member 13 passes the tip 27 of the latch-engaging structure 25.

Once the tips 26 and 27 pass each other as the latch-engaging structure 25 moves in the first direction relative to the latch mechanism 12, the lid-letting pathway closes as the spring element 17 is restored to zero net displacement and fully extends latch member 13 from portion 21 in a third direction 109 as generally depicted in FIGS. 11 and 12. The interface portion 20 receives or supports the structure 28 (in FIGS. 6-18) to which latch-engaging structure 25 is attached and the latch-engaging structure 25 becomes situated within the space 103 as generally and comparatively depicted in FIGS. 6 and 13.

Figure 13:
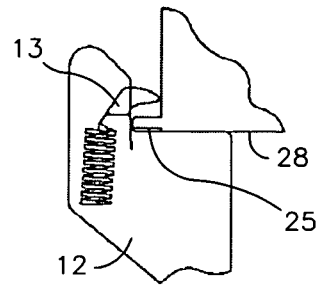
FIG. 13 is a seventh sequential view of the structures otherwise depicted in FIG. 12 showing the latch member with zero net displacement relative to FIG. 7 and the latch-engaging structure being supported by, and latch-secured to the latching mechanism.

Notably, FIG. 13 generally depicts the coupled or latch-secured configuration of latch-engaging structure 25 (outfittable upon either a container lid 11 or a vehicular container 10) and latch mechanism 12 (outfittable upon either a vehicular container 10 or a container lid 11). To release the latch-engaging structure 25 and structure 28 from the latch mechanism 12, the structure 28 and structure 25 are directed in a fourth direction 110 as generally depicted in FIGS. 14-18.

Again, the spring element 17 is actuated but under a latch releasing load applied in the fourth direction 110 to the latch member 13 from the latch-engaging structure 25. When actuated via the latch member 13, the spring element 17 allows the latch member 13 to generally retract in the second direction 108 into portion 21 as sequentially depicted in FIGS. 14-16. FIG. 16 depicts an opened lid-letting pathway in which the tip 26 of latch member 13 again passes the tip 27 of the latch-engaging structure 25.

Figure 17:
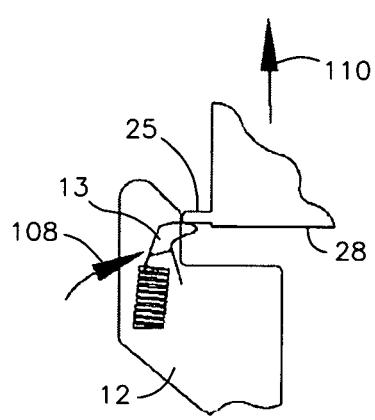
FIG. 17 is a eleventh sequential view of the structures otherwise depicted in FIG. 16 showing the latch-engaging structure just after passing through the lid-letting pathway and the latch member being displaced in the third direction for closing the lid-letting pathway.
Figure 18:
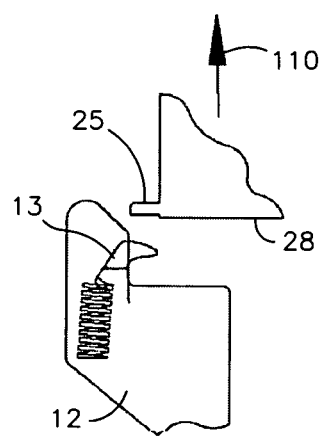
FIG. 18 is a sixth sequential view of the structures otherwise depicted in FIG. 17 showing the latch-engaging structure having passed through the lid-letting pathway and the latch member having returned to zero net displacement relative to FIGS. 7 and 13 thereby closing the lid-letting pathway. Note.
Figure 19:
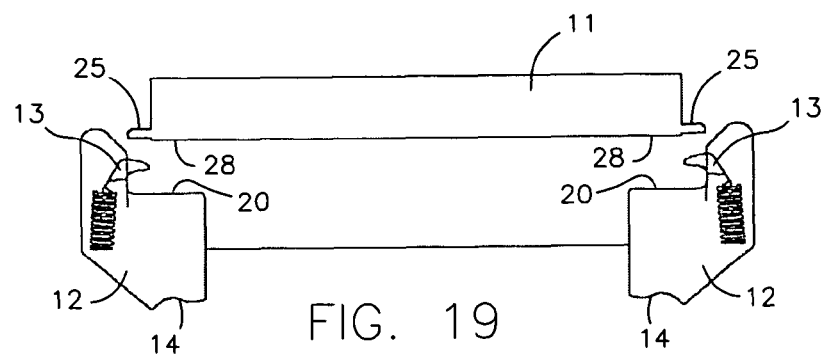
FIG. 19 is a diagrammatic depiction of a lid outfitted with outwardly extending latch-engaging structures juxtaposed in superior adjacency to inwardly extending latch members of opposed latch mechanisms.
Figure 20:
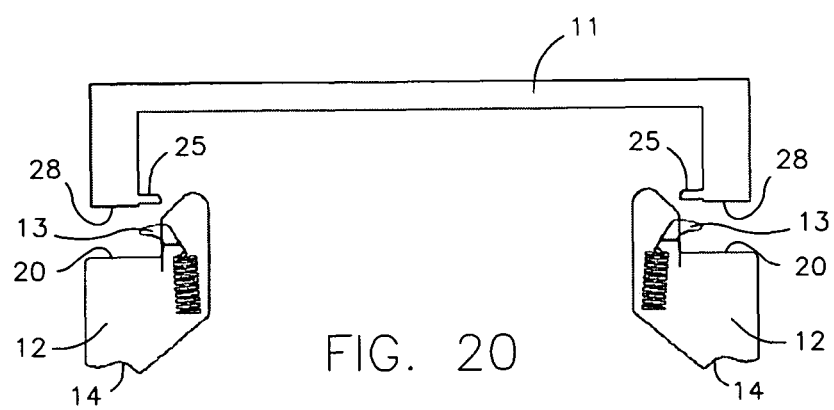
FIG. 20 is a diagrammatic depiction of a lid outfitted with inwardly extending latch-engaging structures juxtaposed in superior adjacency to outwardly extending latch members of opposed latch mechanisms.
Figure 21:
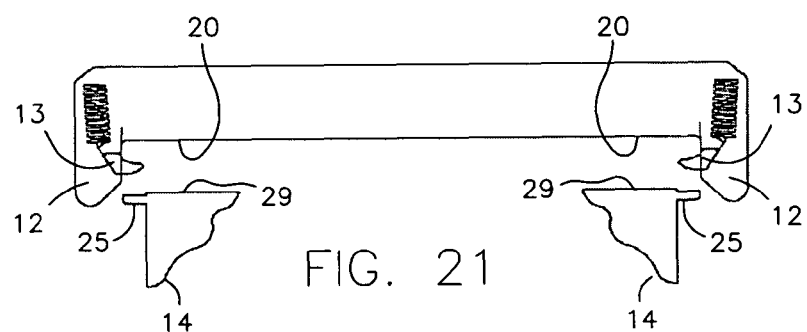
FIG. 21 is a diagrammatic depiction of a lid outfitted with opposed latch mechanism having inwardly extending latch members juxtaposed in superior adjacency to outwardly extending latch-engaging structures.
Figure 22:
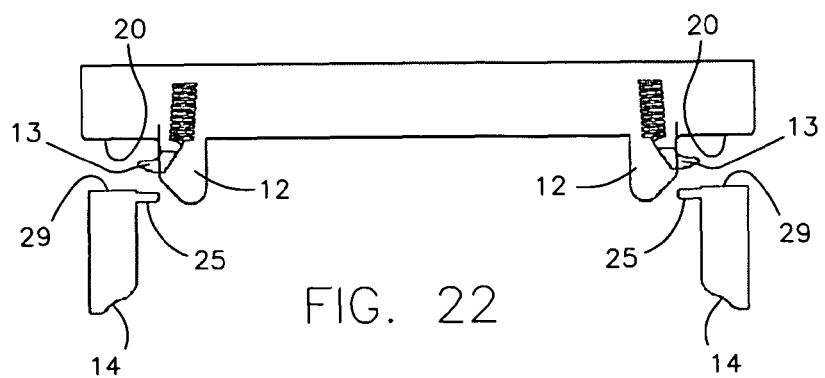
FIG. 22 is a diagrammatic depiction of a lid outfitted with opposed latch mechanism having outwardly extending latch members juxtaposed in superior adjacency to inwardly extending latch-engaging structures.

Once the tips 26 and 27 pass each other as the latch-engaging structure 25 moves in the fourth direction 110 relative to the latch mechanism 12, the lid-letting pathway closes as the spring element 17 is restored to zero net displacement and fully extends latch member 13 from portion 21 in the third direction 109 as generally depicted in FIG. 17. FIGS. 6, 7, and 18 generally depict the latch-released configuration of latch-engaging structure 25 and latch mechanism 12.

Notably, FIG. 8 represents the earliest operational stage of when latch-engaging structure 25 structurally engages latch mechanism 12 for latching securement and thereby initiates contact with the contoured upper latch surface or convex upper-side 31 of latch member 13. As latch-engaging structure 25 is further directed in direction 107 as illustrated in FIGS. 9 and 10, it first engages and then disengages the convex upper side 31 of latch member 13 thereby making contact with the convex upper side 31 of latch member 13 so as to enter the lid-letting pathway for latching securement.

Figure 14:
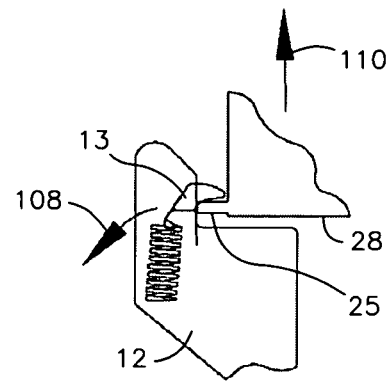
FIG. 14 is an eighth sequential view of the structures otherwise depicted in FIG. 13 showing the latch-engaging structure being directed in a fourth direction opposite the first direction and into engagement with concave surfacing of the latch member.
Figure 15:
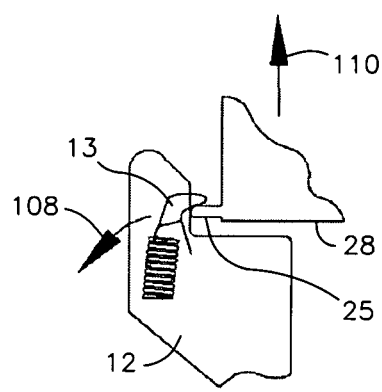
FIG. 15 is a ninth sequential view of the structures otherwise depicted in FIG. 14 showing the latch-engaging structure displacing the latch member via the convex surfacing in the second direction for opening the lid-letting pathway.

FIG. 14, by contrast to FIG. 8, represents the earliest operational stage of when latch-engaging structure 25 structurally engages latch mechanism 12 for latching release and thereby initiates contact with the contoured lower latch surface or concave under side 30 of latch member 13. As latch-engaging structure 25 is further directed in direction 110 as illustrated in FIGS. 15 and 16, it first engages and then disengages the concave under side 30 of latch member 13 thereby making contact with the concave under side 30 of latch member 13 so as to re-enter the lid-letting pathway for latching release.

It is thus contemplated that the present invention may be said to essentially disclose a lid-latching system for vehicular containers as at 10, which system essentially comprises, in combination, a vehicular container lid as at 11, a vehicular container as at 10, certain latching means, and certain latch-engaging means substantially as heretofore described and exemplified.

The vehicular container lid 11 preferably and essentially comprises at least one lid-to-container interface as exemplified by structure 28 and the vehicular container preferably and essentially comprises at least one container-to-lid interface as exemplified by structure 29. The latching means, as perhaps best exemplified by at least one latch mechanism 12, are automatically operable by way of engagement with structure such as latch-engaging structure 25 directed thereagainst. Thus, each latch mechanism 12 is outfittable upon a first select interface as selected from the group consisting of the lid-to-container and container-to-lid interfaces.

The latch-engaging means, as perhaps best exemplified by the latch-engaging structure 25, are similarly outfittable upon a second select interface, which second select interface is selected from the group consisting of the lid-to-container and container-to-lid interfaces as cooperable with the respectively opposed structure(s) of the first select interface. The latch engaging means are structurally directable into engagement with the latching means for automatic and selective latching securement or latching release depending on the directional movement of the latching means relative to the latch-engaging means.

It should be noted, that the present system and certain methodology supported thereby contemplates that a hinged or pivotable vehicular lid structure (as diagrammatically depicted in FIG. 26) outfitted with a latch-engaging interface 40 could very well pivot about a fixed axis of rotation 115 at the junction between a container and lid. In this regard, the non-hinged or free end portions of the lid could very well be outfitted with the latch-engaging interface 40 (or a latch interface as at 50) that could automatically operate by way of interaction with a cooperable latch interface 50 (or a latch-engaging interface 40) so as to latch secure and latch release the hinge-connected lid to the container at the non-hinged portions thereof.

It will thus be understood that while the foregoing descriptions set forth certain specificity, the same has not been presented with a view toward limiting the scope of the invention. Although the invention is described with respect to certain preferred embodiments, modifications thereto will be apparent to those skilled in the art. For example, it is contemplated that the foregoing specifications support a novel assembly comprising a latch-engaging interface and a latch interface, as uniquely configured for lid latching purposes.

In this last regard the latch-engaging interface 40 may be said to preferably and essentially comprise a latch-engaging member as at 25 and a planar first support structure as at 28 or 29. Notably, the latch-engaging member 25 generally extends in a first direction parallel to the first support structure (as at 28 or 29) as so illustrated and described.

The latch interface 50 may be said to preferably and essentially comprise a latch housing as at 16, a latch member as at 13 and a spring element as at 17. The housing comprises a planar second support structure as at 20 and a guide portion as at 19. The latch member 13 comprises a convex first surface as at 31 and a concave second surface as at 30. The second surface 30 opposes the second support structure 20.

The spring element 17 is enclosed within the housing 16 and biases the latch member 13 in a second direction opposite the first direction intermediate the guide portion 19 and the second support structure 20. The latch-engaging member 25 is directable in a third direction as at 107 substantially orthogonal to the first and second directions for engaging the latch member 13.

The latch member 13 is spring-retractable (in the first direction) into the housing 16 in the first direction when engaged by the latch-engaging member 25 for opening a member- or lid-letting pathway as previously described. The latch-engaging member 25 is receivable in the space 103 defined by the second surface 30 and second support structure 20. The latch member 13 is spring-extendable (in the second direction) for closing the member-letting pathway.

Notably, the first and second support structures 28 or 29 and 20 are in contact when the latch-engaging member 13 is received within said space 103. The guide portion 19 is sloped or angled relative to the first and second support structures 28/29 and 20 for structurally guiding the latch-engaging member 25 in a fourth direction as at 111 toward the latch member 13 when the latch-engaging interface 40 is otherwise directed in the first direction 107.

Further, it is contemplated that the foregoing specifications are believed to support certain lid-latching methodology. For example, it is contemplated the foregoing specifications support a vehicular container lid-latching method comprising the exemplary steps of outfitting a vehicular container lid (or vehicular container) with opposed latch-engaging structures as well as outfitting a vehicular container (or container lid) with opposed latch members, which latch members are displaceable in a direction non-parallel relative to latch-operable movement of the latch-engaging structures.

In this regard, it is noted that the method may comprise the steps of directing the latch-engaging structures in a first direction into engagement with the latch members; directing the latch members in a second direction via the latch-engaging structures for opening a lid-letting pathway; directing the lid in the first direction into the lid-letting pathway; and directing the latch members in a third direction opposite the second direction for closing the lid-letting pathway.

To effect latching securement or latching release as a follow-up to the foregoing steps, it is contemplated that the foregoing method may comprise the steps of re-directing the protrusions in a fourth direction opposite the first direction; re-directing the latch members in the second direction via the re-directed latch-engaging structures for re-opening the lid-letting pathway; re-directing the lid into the lid-letting pathway thereby passing tips of the latch members; and re-directing the latch members in the third direction for re-closing the lid-letting pathway.

It should be noted that the step of directing the latch members in the second direction may occur by way of either concave latch member surfacing or convex latch member surfacing. Further, the method may comprise the step of spring-biasing the latch members before outfitting either the vehicular container or the container lid therewith. Opposed springs may be (1) compressed substantially in the first direction via the latch members while directing the latch members in the second direction as generally depicted in FIGS. 9 and 10, or (2) relaxed substantially in the fourth direction while directing the latch members in the third direction.

Figure 23:
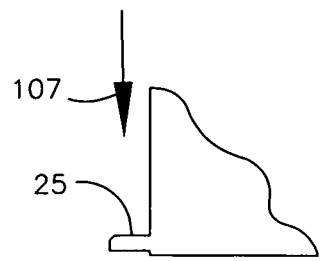
FIG. 23 is a first sequential depiction of the structures otherwise shown in FIG. 6 showing the latch-engaging structure misaligned relative to the latch member of the latching mechanism and being directed in the first direction.
Figure 24:
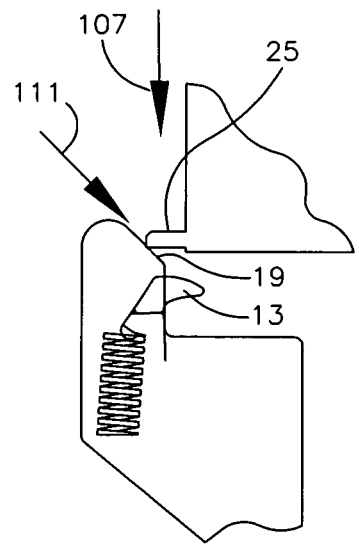
FIG. 24 is a second sequential depiction of the structures otherwise shown in FIG. 6 showing the latch-engaging structure being guided or redirected via a guide portion of the latching mechanism in a fifth direction so as to re-align the otherwise misaligned latch-engaging structure with the latch member as the latch-engaging structure is further directed in the first direction.
Figure 25:
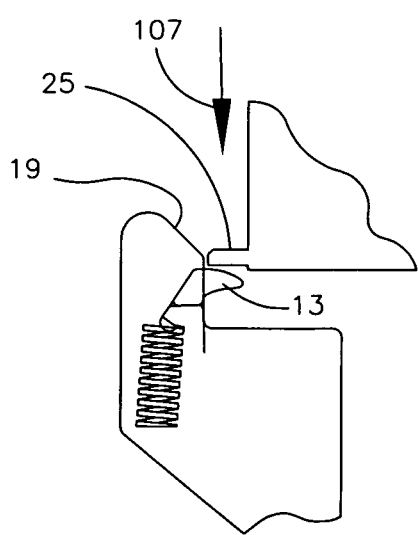
FIG. 25 is a third sequential depiction of the structures otherwise shown in FIG. 6 showing the latch-engaging structure realigned with the latch member as the latch-engaging structure is further directed in the first direction.

Further, the method may comprise the step of guiding the latch-engaging structures toward the latch members via guide structures as may be exemplified by portions 19 while directing the latch-engaging structures in the first direction. In this regard, it may be seen from a comparative inspection of FIGS. 23 through 25 that the latch-engaging structure 25 may interact with sloped portion 19 while being directed in the first direction 107 such that the sloped guide portion 19 guides or redirects the structure 25 in a fifth direction 111 toward the latch member 13.

The method may further comprise the step of aligning the latch-engaging protrusions in superior adjacency to the latch mechanisms before directing the latch engaging protrusions in a downward direction and the step of horizontally leveling the latch-engaging structures or protrusions before directing the latch-engaging structures or protrusions in a downward direction. If misaligned, the method further contemplates the step of guiding the latch-engaging protrusions toward the latch members via laterally opposed guide structures while directing the latch-engaging protrusions downwardly toward the latch mechanisms.

From a comparative inspection of FIGS. 6 and 6(*b*), it may be noted that the present invention contemplates not only vertically engaged or directed latch structures, but also horizontally engaged or directed latch structures. In other words, the latch displacing loads may be horizontally directed (as generally depicted in FIG. 6(*b*)) as well as vertically directed (as generally depicted in FIG. 6) depending on the placement of the cooperable latching structures.

Figure 26:
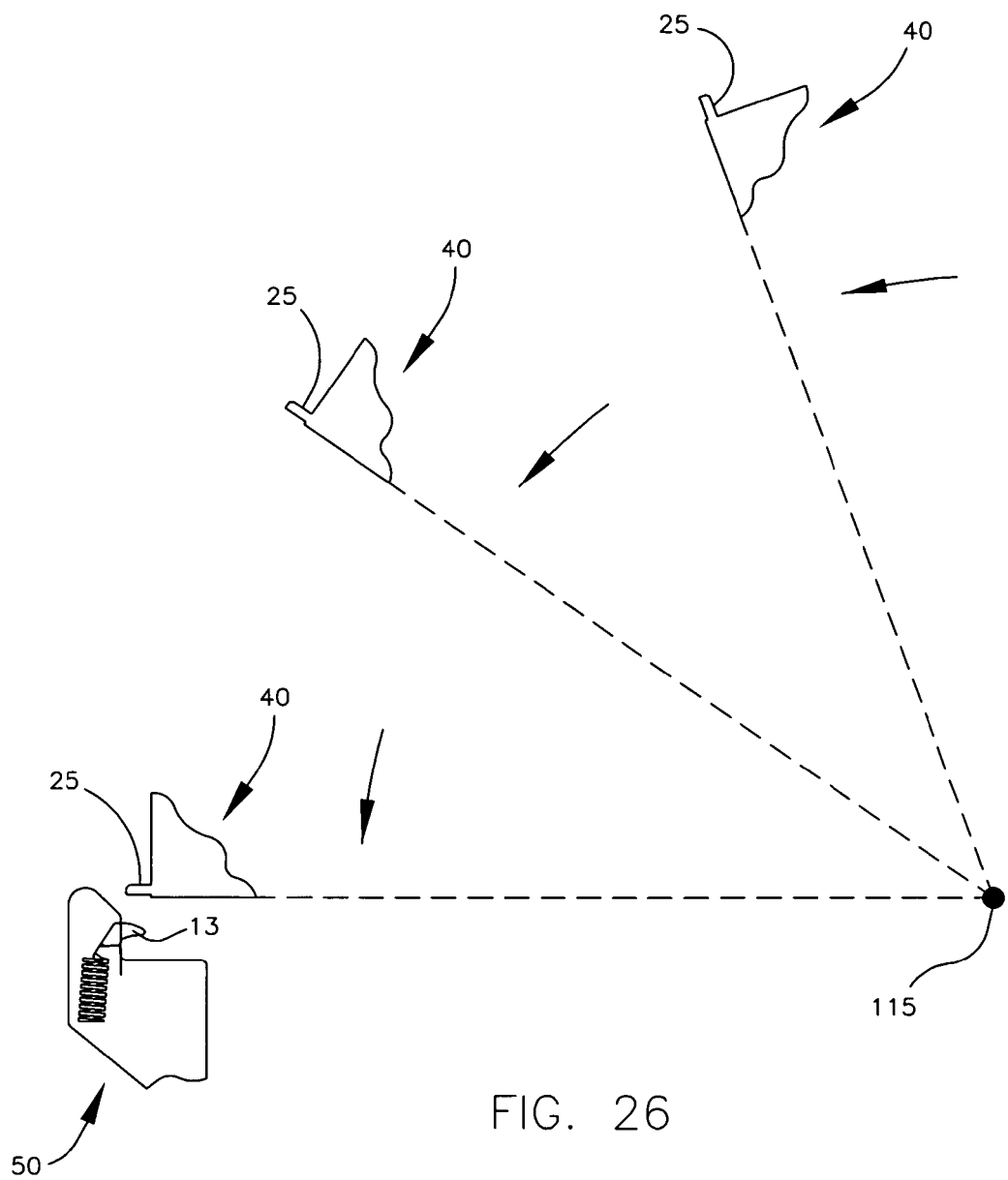
FIG. 26 is a diagrammatic depiction of a hinged or pivotable lid structure being rotated about an axis of rotation such that the latch-engaging structure attached thereto becomes aligned with the latch mechanism when rotated into a horizontal position.

Further, while the typical methodology involves opposed latch-engaging protrusions and opposed latch mechanisms as generally depicted in FIGS. 1, 5, 19-22, it is contemplated that a single latch-engaging structure or protrusion may be made cooperable with a single latch mechanism as exemplified in FIG. 26. Further, although the basic method contemplates a single paired set of opposed latch-engaging protrusions and opposed latch mechanisms, it is further contemplated that multiple paired sets of opposed latch-engaging protrusions and opposed latch mechanisms may be outfitted upon a vehicular container and container lid as generally depicted in FIG. 2. In this regard, it is noted that heavier, longer lids may require additional latching systems to properly secure the lid 11 to the container 10.

Accordingly, although the invention has been described by reference to certain preferred and alternative embodiments, and certain methodology, it is not intended that the novel disclosures herein presented be limited thereby, but that modifications thereof are intended to be included as falling within the broad scope and spirit of the foregoing disclosure, the following claims and the appended drawings.

We claim:

1. A vehicular container, lid-latching system, the lid-latching system comprising, in combination:
   a vehicular container lid, the lid comprising at least one lid-to-container interface;
   a vehicular container, the container comprising at least one container-to-lid interface;
   a latch mechanism for latch-securing and latch-releasing the lid to the container, said latch mechanism comprising a housing, a spring-actuable, latch member, and a spring element, the housing comprising a path-defining portion, a lid-supporting interface portion, a latch member-receiving portion, and a spring-enclosing portion, the latch member being pivotally mounted within the latch member-receiving portion for pivotal movement therein, the latch member comprising a nose portion having upper and under cam surfaces, the spring element being engaged with said latch member within the spring-enclosing portion for biasing said nose portion exteriorly of the latch member-receiving portion when said cam surfaces are not in use, the latch mechanism being automatically operable by way of engagement with structure directed thereagainst and being outfittable upon a first select interface, the first select interface being selected from the group consisting of the lid-to-container and container-to-lid interfaces; and
   latch-engaging structure for engaging the latch mechanism, the latch-engaging structure being outfittable upon a second select interface, the second select interface being selected from the group consisting of the lid-to-container and container-to-lid interfaces, the latch-engaging structure being structurally directable via the path-defining portion into engagement with the cam surfaces of the latch mechanism for automatic and selective latching securement or latching release of the lid relative to the container, the lid being supportable by the lid-supporting interface portion when in latched securement.

2. The lid-latching system of claim 1 wherein the latch mechanism is outfittable upon the container-to-lid interface and the latch mechanism is outfitted upon the lid-to-container interface.

3. The lid-latching system of claim 1 wherein the lid is directable in a first direction relative to the container, the latch member being displaceable in a second direction via structural engagement with the latch-engaging structure extending in the second direction for opening a lid-letting pathway.

4. The lid-latching system of claim 3 wherein the latch member is displaceable via structural disengagement with the latch-engaging structure in a third direction opposite the second direction for closing the lid-letting pathway.

5. The lid-latching system of claim 4 wherein structural engagement intermediate the latch-engaging structure and the latch member is defined by directing the latch-engaging structure against contoured upper cam surfacing of the latch member for latching securement.

6. The lid-latching system of claim 5 wherein structural engagement intermediate the latch-engaging structure and the latch member is defined by directing the latch-engaging structure against contoured lower cam surfacing of the latch member for latching release.

7. The lid-latching system of claim 6 wherein the latch mechanism comprises a guide portion for directing the latch-engaging structure in a fourth direction into structural engagement with the nose portion of the latch member.

8. A vehicular container, lid-latching system, the lid-latching system comprising, in combination:
   a vehicular container lid, the lid comprising at least one lid-to-container interface and latch-engaging structure; and a vehicular container, the container comprising at least one container-to-lid interface and a latch mechanism for latch-securing and latch-releasing the vehicular container lid to the vehicular container via the latch-engaging structure, said latch mechanism comprising a housing, a spring-actuable, latch member, and a spring element, the housing comprising a latch member-receiving portion and a spring-enclosing portion, the latch member being pivotally mounted within the latch member-receiving portion pivotal movement therein, the latch member comprising a nose portion, the spring element being engaged with said latch member within the spring-enclosing portion for biasing said nose portion exteriorly of the latch member-receiving portion when said nose portion is not in use, the latch mechanism being automatically operable by way of engagement with the latch-engaging structure, the latch-engaging structure being structurally directable into engagement with the nose portion of the latch member for automatic and selective latching securement or latching release of the lid relative to the container.

9. The lid-latching system of claim 8 wherein the lid is directable in a first direction relative to the container, the latch member being displaceable via structural engagement with the latch-engaging structure in a second direction for opening a lid-letting pathway.

10. The lid-latching system of claim 9 wherein the latch member is displaceable via structural disengagement with the latch-engaging structure in a third direction opposite the second direction for closing the lid-letting pathway.

11. The lid-latching system of claim 10 wherein structural engagement intermediate the latch-engaging structure and the latch member is defined by directing the latch-engaging structure against contoured upper surfacing of the nose portion of the latch member for latching securement.

12. The lid-latching system of claim 11 wherein structural engagement intermediate the latch-engaging structure and the latch member is defined by directing the latch-engaging structure against contoured lower surfacing of the nose portion of the latch member for latching release.

13. The lid-latching system of claim 10 wherein the latch mechanism comprises guide means for directing the latch-engaging structure in a fourth direction into structural engagement with the latch member.

14. A vehicular container, lid-latching system, the lid-latching system comprising, in combination:

a vehicular container lid, the lid comprising at least one lid-to-container interface, the lid-to-container interface comprising latch-engaging structure; and a vehicular container, the container comprising at least one container-to-lid interface, the container-to-lid interface comprising a latch mechanism for latch-securing and latch-releasing the vehicular container lid to the vehicular container via the latch-engaging structure, said latch mechanism comprising a housing, a spring-actuable, latch member, and a spring element, the housing comprising a latch member-receiving portion and a spring-enclosing portion, the latch member being pivotally mounted within the latch member-receiving portion for pivotal movement therein, the latch member comprising a nose portion, the spring element being engaged with said latch member within the spring-enclosing portion for biasing said nose portion exteriorly of the latch member-receiving portion when said nose portion is not in use, the latch mechanism being automatically operable by way of engagement with the latch-engaging structure, the latch-engaging structure being structurally directable into engagement with the latch member for automatic and selective latching securement or latching release of the lid relative to the container.

15. The lid-latching system of claim 14 wherein the lid is directable in a first direction relative to the container, the latch member being displaceable via structural engagement with the latch-engaging structure in a second direction for opening a lid-letting pathway.

16. The lid-latching system of claim 15 wherein the latch member is displaceable via structural disengagement with the latch-engaging structure in a third direction opposite the second direction for closing the lid-letting pathway.

17. The lid-latching system of claim 16 wherein structural engagement intermediate the latch-engaging structure and the latch member is defined by directing the latch-engaging structure against contoured upper surfacing of the latch member for latching securement.

18. The lid-latching system of claim 17 wherein structural engagement intermediate the latch-engaging structure and the latch member is defined by directing the latch-engaging structure against contoured lower surfacing of the latch member for latching release.

19. The lid-latching system of claim 16 wherein the latch mechanism comprises guide means for directing the latch-engaging structure in a fourth direction into structural engagement with the latch member.

* * * * *